(12) United States Patent
Vangala et al.

(10) Patent No.: US 8,107,338 B2
(45) Date of Patent: Jan. 31, 2012

(54) POWER CALIBRATION IN OPTICAL DISC DRIVES

(75) Inventors: Venkata Ramana Vangala, Singapore (SG); Sreenivas Mamidi, Singapore (SG); Johan Bin Jumahat, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 24 days.

(21) Appl. No.: 12/594,636

(22) PCT Filed: Apr. 11, 2008

(86) PCT No.: PCT/IB2008/051371
§ 371 (c)(1),
(2), (4) Date: Dec. 23, 2009

(87) PCT Pub. No.: WO2008/126032
PCT Pub. Date: Oct. 23, 2008

(65) Prior Publication Data
US 2010/0103786 A1    Apr. 29, 2010

(30) Foreign Application Priority Data
Apr. 11, 2007 (EP) .................................. 07105927

(51) Int. Cl.
*G11B 7/00* (2006.01)
(52) U.S. Cl. ............... 369/53.26; 369/116; 369/47.53; 369/53.23

(58) Field of Classification Search .................. None
See application file for complete search history.

(56) References Cited

U.S. PATENT DOCUMENTS

| | | | |
|---|---|---|---|
| 7,263,043 B2 * | 8/2007 | Watanabe et al. | 369/47.5 |
| 2002/0089910 A1 | 7/2002 | Ohba | |
| 2003/0086346 A1 | 5/2003 | Fukumoto | |
| 2005/0174906 A1 * | 8/2005 | Narumi et al. | 369/47.53 |
| 2007/0041294 A1 * | 2/2007 | Kakimoto et al. | 369/47.53 |
| 2007/0291603 A1 * | 12/2007 | Jung | 369/47.5 |
| 2008/0101174 A1 * | 5/2008 | Lin | 369/47.5 |

FOREIGN PATENT DOCUMENTS

| | | |
|---|---|---|
| WO | 2005008642 A2 | 1/2005 |
| WO | 2005114661 A1 | 12/2005 |

OTHER PUBLICATIONS 08-737-798.2-1232—Communication Pursuant to Article 94(3) EPC, May 28, 2010.

* cited by examiner

*Primary Examiner* — Lixi C Simpson

(57) ABSTRACT

A method for reducing overall power calibration time and increasing the number of power calibrations that can be done on an optical record carrier includes performing a first set of power calibration procedures on an optical record carrier at a first recording speed in a first set of calibration areas, and performing a further set of power calibration procedures on the optical record carrier at a recording speed different from the first recording speed. The further set of power calibration procedures partly uses information from the first set of calibration areas.

10 Claims, 6 Drawing Sheets

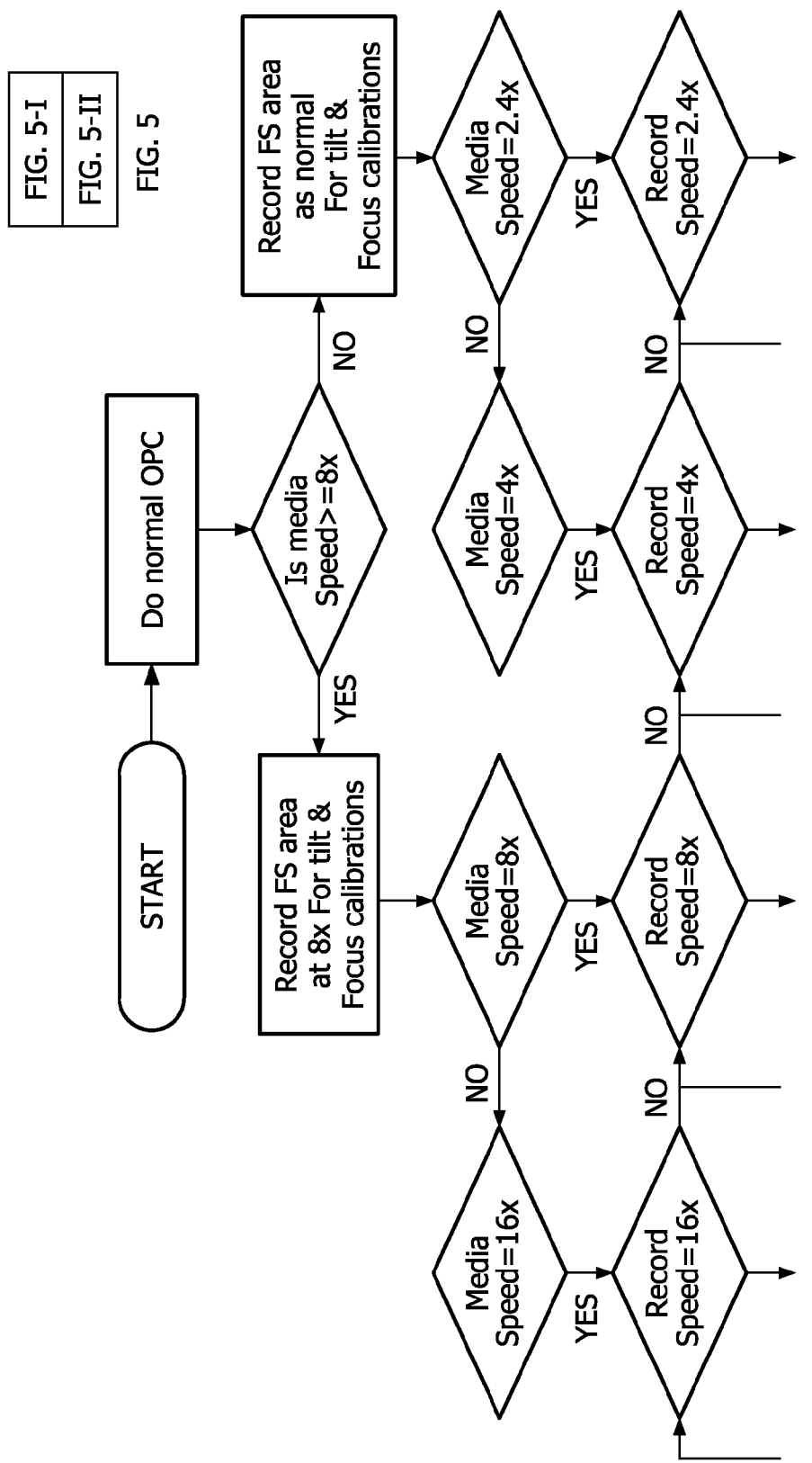
FIG. 5-I

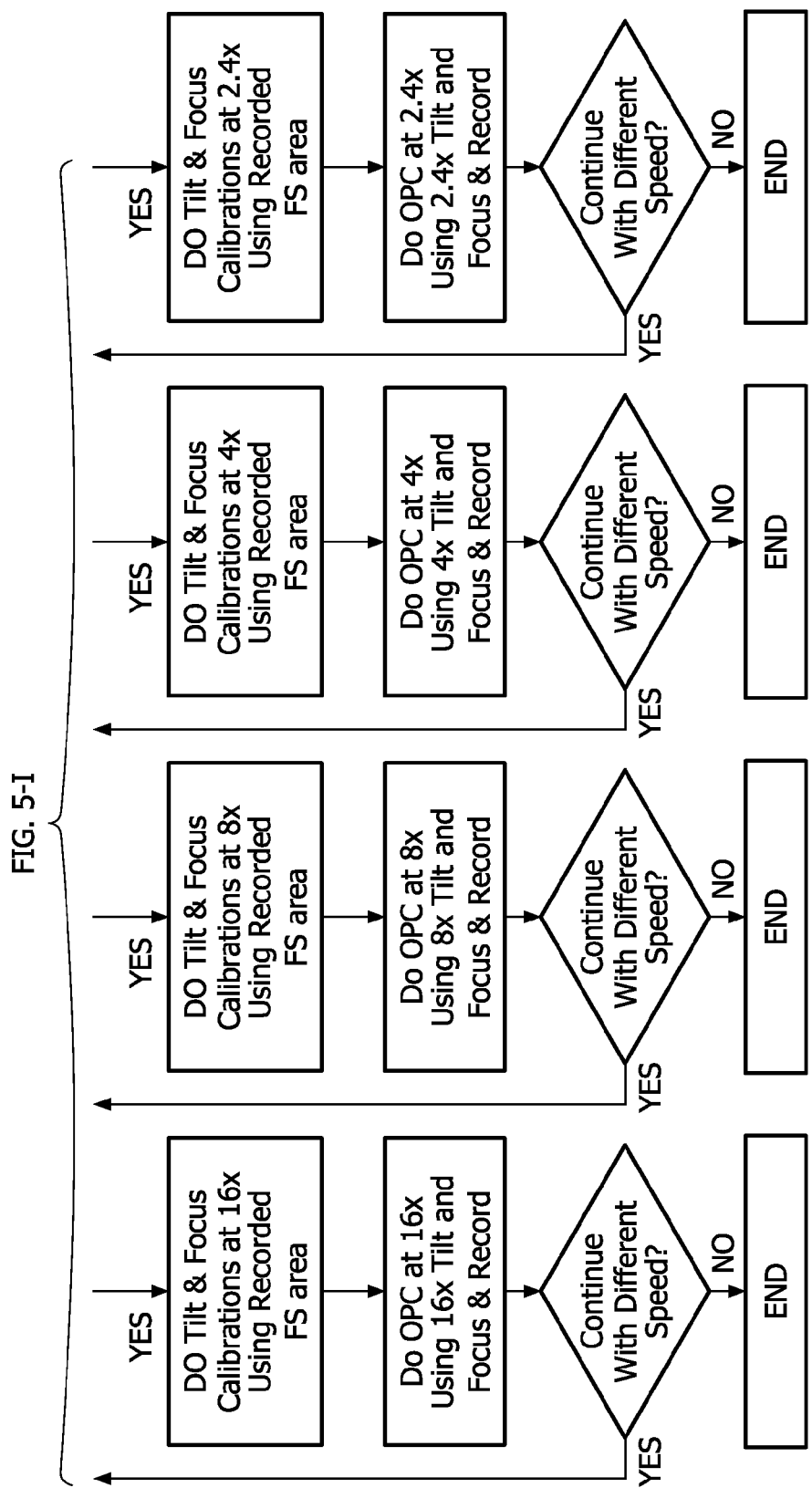
FIG. 5-II

POWER CALIBRATION IN OPTICAL DISC DRIVES

FIELD OF THE INVENTION

The subject matter relates to power calibration in optical disc drives, and more specifically, to power calibration in optical disc drives that support multi-speed recording.

BACKGROUND OF THE INVENTION

US patent 20020089910 discloses an optimum power calibration procedure that can be performed on an optical disk. The optimum power calibration procedure has to be repeated for each recording speed, in case the optimum power calibration procedure has to be carried out at multiple recording speeds. This requires considerable amount of calibration area on the optical disk.

It would be advantageous to have an optimum power calibration procedure that uses the calibration area effectively. It would be also advantageous to have an optical drive that performs an optimum power calibration procedure using the calibration area effectively.

SUMMARY OF THE INVENTION

A method comprising performing a first set of power calibration procedures on an optical record carrier at a first recording speed in a first set of calibration areas and performing a further set of power calibration procedures on the optical record carrier at a recording speed different from the first recording speed, wherein the further set of power calibration procedures partly uses information from the first set of calibration areas is disclosed.

An optical drive comprising means arranged to perform a first set of power calibration procedures on an optical record carrier at a first recording speed in a first set of calibration areas and means arranged to perform a further set of power calibration procedures on the optical record carrier at a recording speed different from the first recording speed, wherein the further set of power calibration procedures partly uses information from the first set of calibration areas is disclosed.

Furthermore, the method could be implemented with a computer program.

BRIEF DESCRIPTION OF THE DRAWINGS

These and other aspects, features and advantages will be further explained by the following description, by way of example only, with reference to the accompanying drawings in which same reference numerals indicate same or similar parts, and in which:

FIG. 5 shows a detailed flowchart of a power calibration procedure at multi-speeds according to an embodiment of the subject matter.

Referring to FIG. 1, the optical record carrier 10 (Cf. FIG. 1) is constant angular velocity (CAV) controlled or constant linear velocity (CLV) controlled by a spindle motor 52. An optical pick-up unit 54 records data on the optical record carrier 10 by using laser light (at a recording power value) emitted form a laser diode. When the data is to be recorded, it is supplied to an encoder unit 58 and the data encoded by the encoder unit 58 is supplied to a laser diode-driving unit 56. The laser diode-driving unit 56 generates a drive signal based on the encoded data and supplies the drive signal to the laser diode of the optical pick-up unit 54. In addition, a control signal from a control unit 59 is supplied to the laser diode-driving unit 56 so that the recording strategy and recording power are determined by the control signal. However, when the data is read from the optical record carrier 10, the laser diode of the optical pick-up unit 54 emits laser light of a read power (read power<record power), and the reflected light is received. The received reflected light is converted into an electrical signal and a read RF signal is obtained. The read RF signal is supplied to an RF signal-processing unit 50.

The RF signal-processing unit 50 comprises an equalizer, a binarizing unit, a phase-locked loop (PLL) unit, and binarizes the read RF signal, generates a synchronous clock, and supplies these signals to a decoder unit 57. The decoder unit 57 decodes data based on these supplied signals and outputs the decoded data as read data.

The optical drive 500 also includes a circuit (for data read-out) for controlling the focus servo and/or tracking servo by producing a tracking error signal and/or a focus error signal respectively, and a wobble signal formed on the optical record carrier 10 (e.g. for use in address demodulation or for controlling the number of rotations). The servo control structures are identical to those in conventional drive systems and therefore are not described in detail.

Figure 1:
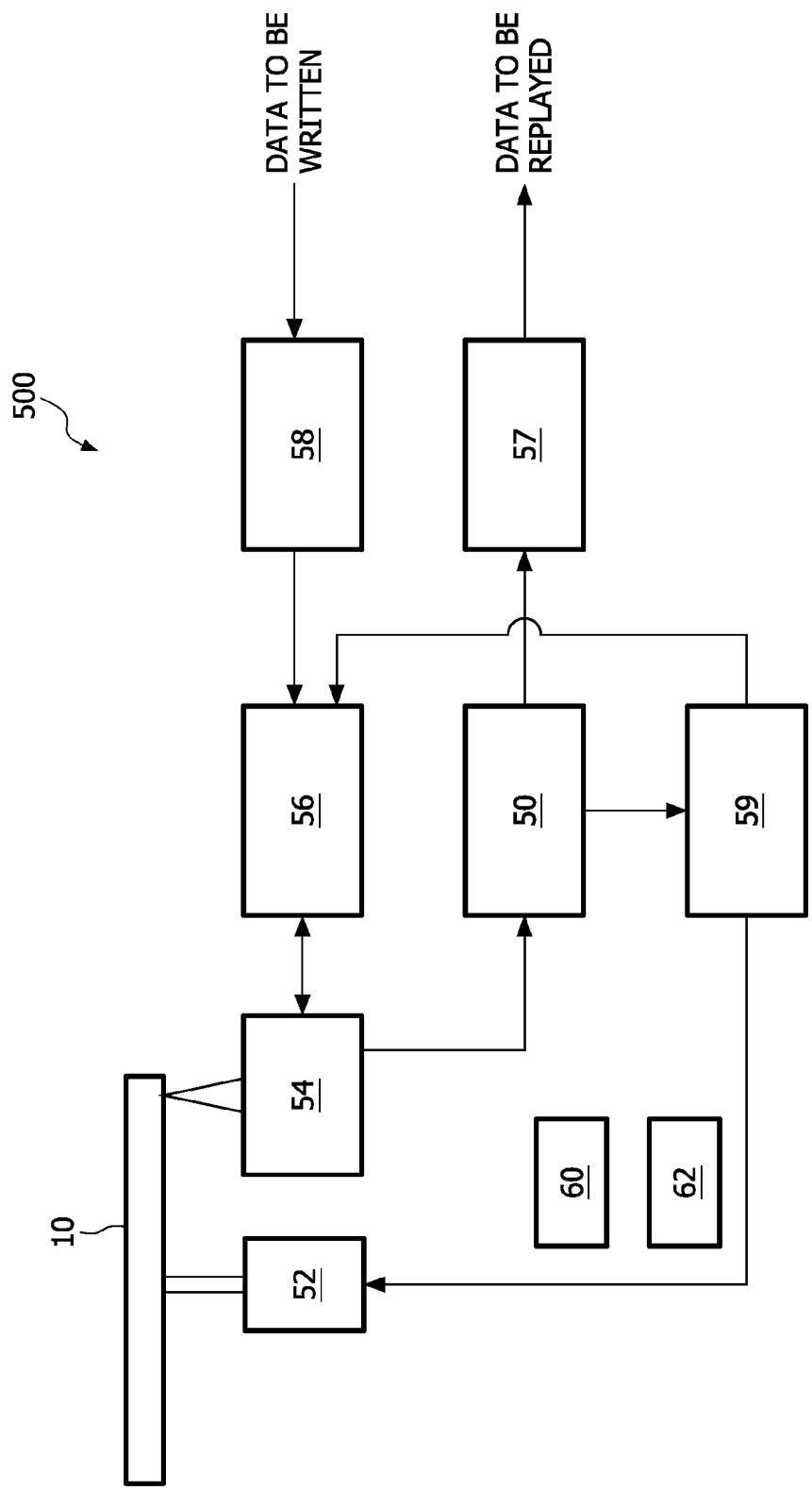
FIG. 1 schematically shows an exemplary optical drive.

The construction shown in FIG. 1 only illustrates portions related to the general operation of the optical drive 500. The description and detailed explanation of servo circuits for controlling the optical pick-up unit, the spindle motor, the slide motor, and the control circuits are omitted, because they are constructed in a similar manner as in conventional drive systems.

Determining the laser power and write strategy to be used for recording on the optical record carrier for a particular speed is critical in determining the quality of recording. The laser power for writing at a recording speed for each optical drive/optical record carrier combination is determined by a process referred to as the optimum power control (OPC). The OPC procedure is generally performed in predefined zones on the optical record carrier. This requires considerable amount of space on the optical record carrier and a considerable amount of system time. Generally, on a particular optical record carrier the number of calibration procedures that can be performed is limited by the size allocated for the predefined zones and the number of speeds at which recording is done. Once the calibration area is completed further recordings cannot be done even though there is space in the data recording area.

Generally, on the optical record carrier (e.g. dye media) there are two test zones, the inner test zone and the outer test zone, defined for the purpose of power calibration. The inner test zone begins at radius 22.616 mm and the outer test zone begins at 58.139 mm of the optical record carrier. Normally, the optical drive uses the inner test zone for performing the power calibration; the outer test zone is used in special cases like multi-session and editing. The inner and outer test zones have a length of 1024 ECC blocks which is equal to 4096 (1024*4) Address in pre-groove (ADIP) frames. Once the test zone is full the optical record carrier cannot be further used.

Figure 2:
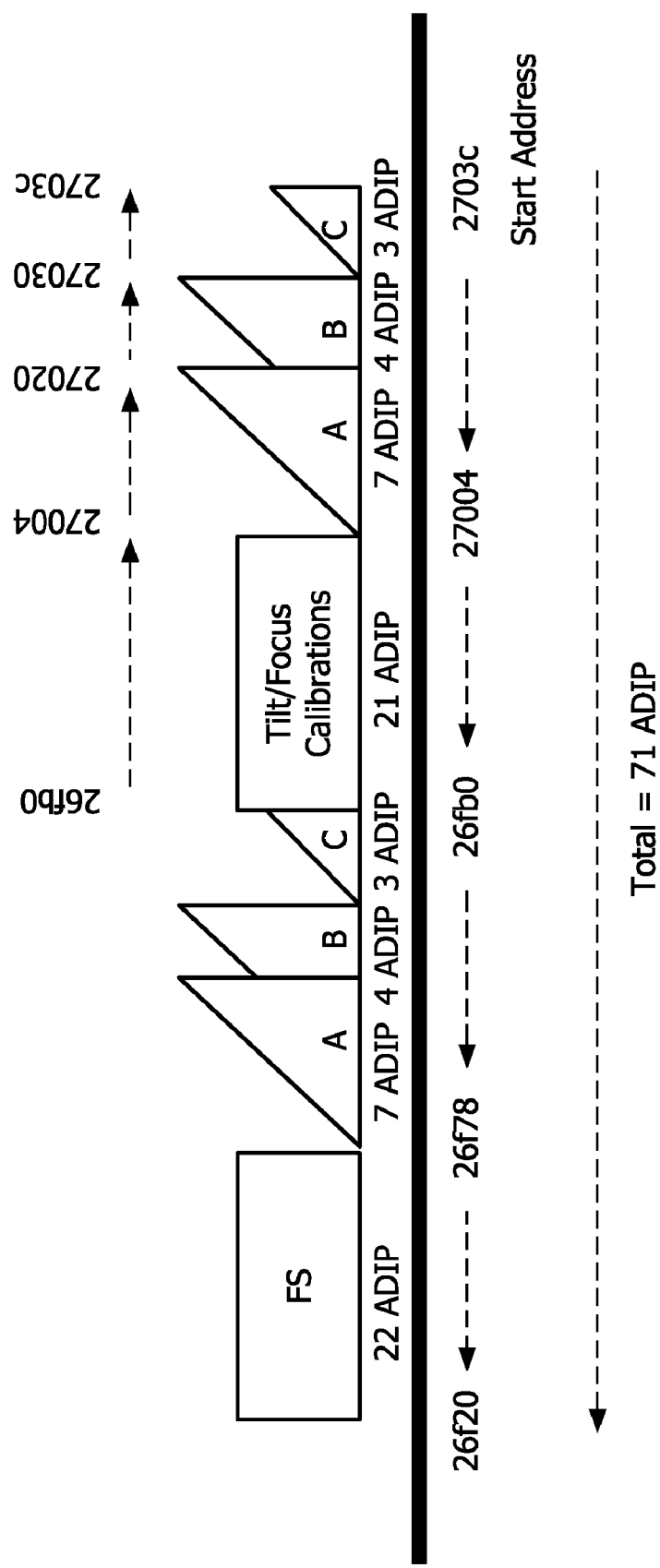
FIG. 2 schematically shows details of an exemplary power calibration procedure at single speed.

Referring now to FIG. 2, the OPC procedure at single speed involves the following steps:

i) an initial OPC procedure that is performed on 14 ADIP frames to find the optimum power value which is shown as A, B, C. The complete process of the OPC procedure requires two revolutions. The first is a complete revolution indicated as part A and the second one is divided into two parts namely part C and part B. As the inner radii of the optical record carrier consist of 7 ADIP frames for each revolution, part A requires 7 ADIP frames. In the second revolution, part B requires 4 ADIP frames and part C requires 3 ADIP frames.

ii) an initial test recording procedure on 21 ADIP frames using the found optimum power value. The purpose of initial test recording is to provide a recorded area for performing the necessary tilt and focus offset calibrations.

iii) a final OPC procedure that is performed on 14 ADIP frames using the found tilt and focus offset values which is again shown as A, B, C iv) a test recording procedure on 22 ADIP frames using the above found optimum power value, the tilt offset value and the focus offset value to be used for forward sense calibration.

It can be seen in FIG. 2 that to perform the OPC procedure once at a given speed requires approximately about 71 ADIP frames (14+21+14+22).

Figure 3:
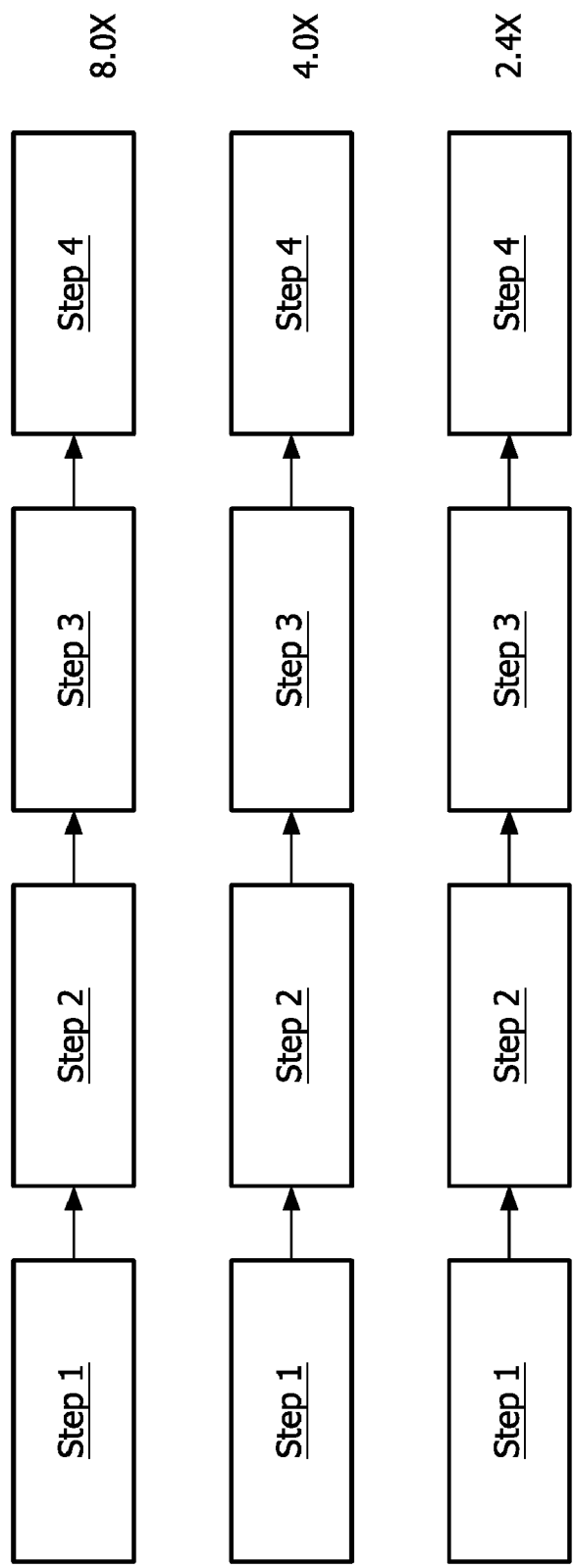
FIG. 3 shows a schematic block diagram of an exemplary power calibration procedure at multi-speeds.

FIG. 3 shows audio, video and data recorders being designed to record at multi-speeds. The steps of the OPC procedure listed above (Cf. FIG. 2) are normally repeated for each and every speed. The four steps required for performing the OPC procedure at each speed are:

Step 1: Initial OPC procedure requiring 14 ADIP frames
Step 2: Tilt and focus offset calibration requiring 22 ADIP frames
Step 3: Final calibration requiring 14 ADIP frames and
Step 4: Forward sense calibration requiring 22 ADIP frames All the above four steps have to be repeated at different speeds e.g. 8.0×, 4.0× and 2.4×. The power calibration at each speed takes approximately about 71 ADIP frames. Hence, for an optical drive that supports three different recording speeds (e.g. 8.0×, 4.0× and 2.4×); the total power calibration space required is approximately 213 ADIP frames (71 ADIP frames×3). Therefore, the usage of the calibration area is increased with the increase in the number of recording speeds. Once the calibration area is completed, further recordings cannot be performed even though there is space available in the data recording area.

DETAILED DESCRIPTION OF EMBODIMENTS

A method comprising performing a first set of power calibration procedures on an optical record carrier at a first recording speed in a first set of calibration areas and performing a further set of power calibration procedures on the optical record carrier at a recording speed different from the first recording speed, wherein the further set of power calibration procedures partly uses information from the first set of calibration areas is disclosed.

The disclosed method makes use of the calibration area effectively by using information from the first set of calibration areas and re-using the calibration area from the first recording speed to the subsequent recording speeds. The advantages of the disclosed method are:

i) reduction in the overall power calibration time required at various recording speeds which in-turn improves the ready to record time;
ii) increase in the effective utilization of the power calibration area there by increasing the number of power calibrations that can be done on the optical record carrier; and
iii) performing only the required calibrations.

In an embodiment, the further set of power calibration procedures is obtained using a subset of the first set of calibration areas. For example, when the recording speed is 16× and the OPC procedure is performed at 16× and when there is a necessity to spin down to 8×, according to the disclosed method there is no need to repeat the complete OPC procedure. Some of the information available in the calibration areas that was obtained while conducting the OPC procedure at 16× can be re-used to do tilt and focus offset calibrations at lower speeds such as 8×, 4× and 2.4×. Hence, the time and the calibration area required for finding the optimal power can be reduced.

In a further embodiment, the first set of calibration areas includes the following:
an area for optimum power calibration
an area for a tilt and focus offset calibration
an area for a forward sense calibration.

This is advantageous since the calibration information from the first recording speed can be used for subsequent recording speeds.

In a still further embodiment, the subset of the first set of power calibration areas includes at least one of:
the area for the tilt and focus offset calibration
the area for the forward sense calibration.

This is advantageous since the respective tilt and focus offset values can be obtained for any chosen recording speed.

In a still further embodiment, the further set of power calibration procedures includes using an earlier recorded area for forward sense calibration and performing the further optimum power calibration and the further forward sense calibration. This has the following advantages:

i) effective utilization of the available power calibration area on the optical record carrier
ii) increase in the number of power calibrations that can be achieved on the optical record carrier
iii) reduction in the overall power calibration time required at various recording speeds in-turn improving the ready to record time.

In a still further embodiment, performing the first set of power calibration procedures on the optical record carrier at the first recording speed includes the following steps:

1. performing the initial optimum power control procedure and finding the initial optimum power value
2. performing the tilt and focus offset calibration using the found initial optimum power value and finding the tilt offset value and the focus offset value
3. performing the final optimum power calibration using the found tilt offset value, the found focus offset value and finding a final optimum power value
4. performing a forward sense calibration using the found optimum power value, the found tilt offset value and the found focus offset value.

This has the following advantages:
i) Tilt offset and the focus offset values can be calibrated exactly at the required speed
ii) The final optimum power can be derived by using the calibrated tilt offset and focus offset values at the given speed and hence the optimal power derived from this is more reliable.

In a still further embodiment, performing the further set of power calibration procedures on the optical record carrier at the recording speed different from the first recording speed includes:

1. performing the further optimum power calibration using the subset of the first set of power calibration areas associated with the first set of power calibration procedures and finding the optimum power value, the tilt offset value and the focus offset value
2. performing the forward sense calibration using the found optimum power value.

Figure 4:
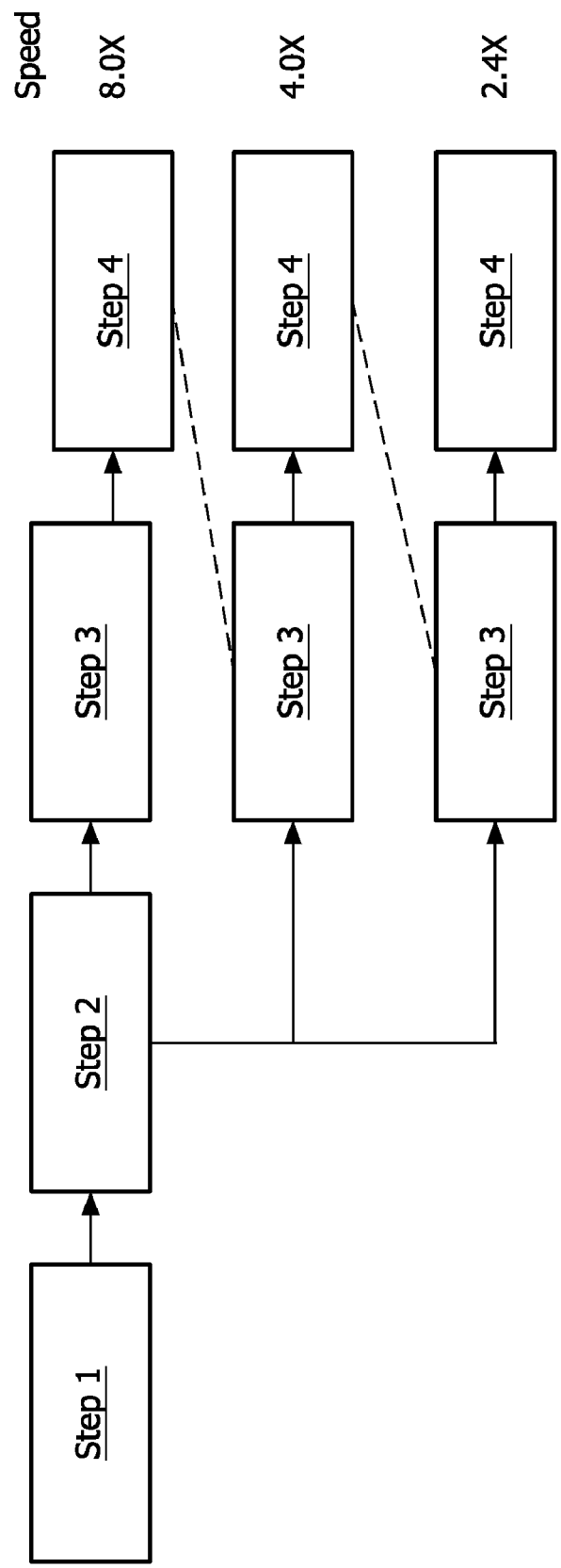
FIG. 4 shows a schematic block diagram of a power calibration procedure at multi-speeds according to an embodiment of the subject matter.

FIG. 4 shows that at 8.0× speed all the four steps are required namely:
Step 1: Initial calibration requiring 14 ADIP frames
Step 2: Tilt and focus offset calibration requiring 22 ADIP frames Step 3: Final calibration requiring 14 ADIP frames
Step 4: Forward sense calibration requiring 22 ADIP frames It can be seen in FIG. 4 that at speeds 4.0× and 2.4×, the tilt and focus offset calibration areas used in steps 1 and 2 are being re-used for carrying out the final calibration and obtaining the optimum power value. Hence the disclosed method results in a saving of approximately 36 ADIP frames. This is advantageous in case of DVD-R where the available test area for the purpose of calibrations is significantly lower compared to DVD+R.

In a still further embodiment, in performing the further optimum power calibration, a recorded area which is already present on the optical record carrier is re-used. The recorded area can be one of an initial focus offset calibration area; an initial tilt offset calibration area and a forward sense calibration area. For example, if the optical record carrier recording speed was 16× and the OPC procedure was carried out at 16×, due to some reasons whenever there is a necessity for the system to spin down, the system spins down to 8×, then according to the disclosed method there is no need to carry out the complete OPC procedure. The tilt and focus offset calibration area used during the previous OPC procedure can be re-used to do the tilt and focus offset calibrations at lower speeds like 8×, 4× or even 2.4×. Alternately, the forward sense area from the previous OPC can also be re-used for the tilt and focus offset calibrations. The above technique allows effective utilization of the optical record carrier power calibration area and can reduce the time for finding the optimal power.

It can be seen in FIG. 5 that the disclosed multi-speed power calibration procedure includes the following steps:

Step 1: Complete the start-up procedure after inserting the optical record carrier
Step 2: Check the recording speed
Step 3: Conduct OPC procedure with the optical record carrier specified speed according to the conventional method.
Step 4: If the system requests to spin down, then proceed to step 5 else proceed to step 7.
Step 5: Spin down to the next lower requested speed
Step 6: Conduct tilt offset and focus offset calibrations at the lower requested speed using the previous OPC procedure tilt and focus offset calibration area or by using the forward sense area from the previous OPC procedure and then proceed to step 4.
Step 7: Start recording at the lower requested speed by using the results of the optimum power for recording, and the optimum tilt offset and the optimum focus offset values.

Table 1 shows advantages of the disclosed technique over the conventional technique.

different speeds. The conventional technique requires 288 ADIP frames whereas the proposed technique requires only 180 ADIP frames. The conventional technique can support approximately 14 calibrations whereas with the disclosed technique it is possible to achieve 22 calibrations. Further, the conventional technique requires 24 seconds of calibration time whereas the proposed technique requires only 15 seconds of calibration time.

The optical drive of FIG. 1 can be adapted to perform the method of power calibration as disclosed in the embodiments. To this end, the optical drive includes i) means 60 arranged to perform a first set of power calibration procedures on an optical record carrier at a first recording speed in a first set of calibration areas and ii) means 62 arranged to perform a further set of power calibration procedures on the optical record carrier at a recording speed different from the first recording speed, wherein the further set of power calibration procedures partly uses information from the first set of calibration areas.

A recorder comprising the optical drive as disclosed in the embodiments can reduce the overall power calibration time required at various recording speeds which in turn can improve the ready to record time. The recorder can be a data recorder or an audio recorder or a video recorder.

Although the present subject matter has been explained by using embodiments using exemplary optical drives and discs, the technique is applicable to all types of optical drives and optical record carriers, e.g. write-once media and write-many recordable types (DVD-RW, DVD+RW, HD-DVD, Blu-ray disc). Further, the above technique is not limited to a single sided record carrier. The technique is also applicable to a two-layer one sided record carrier, i.e. a dual layer record carrier, or to a two-layer double sided record carrier, i.e. a dual layer double sided record carrier. A person skilled in the art can implement the described embodiments in software or in both hardware and software. Other variations to the disclosed embodiments can be understood and effected by those skilled in the art of practicing the claimed subject matter, from a study of the drawings, the disclosure and the appended claims. The use of the verb "comprise" does not exclude the presence of elements other than those stated in a claim or in the description. The use of the indefinite article "a" or "an" preceding an element or step does not exclude the presence of a plurality of such elements or steps. The figures and description are to be regarded as illustrative only and do not limit the subject matter.

TABLE 1

| Recording Speed | Number of ADIP frames for each calibration | | Number of Calibrations | | Calibration Time (Secs) | |
|---|---|---|---|---|---|---|
| | Conventional | Proposed | Conventional | Proposed | Conventional | Proposed |
| 2.4× | 72 | 72 | 56 | 56 | 6 | 6 |
| 2.4× + 4.0× | 144 | 108 | 28 | 38 | 12 | 9 |
| 2.4× + 4.0× + 8.0× | 216 | 144 | 19 | 28 | 18 | 12 |
| 2.4× + 4.0× + 8.0× + 16× | 288 | 180 | 14 | 22 | 24 | 15 |

Table 1 also shows the number of calibrations and the calibration time required at various recording speeds. It can be seen in Table 1 that the advantage of the disclosed technique is two folded; namely increase in the number of possible power calibrations and reduction in the calibration time at

The invention claimed is:

1. A method comprising:
performing a first set of power calibration procedures on an optical record carrier at a first recording speed in a first set of calibration areas; and performing a further set of power calibration procedures on the optical record carrier at a recording speed different from the first recording speed, wherein the further set of power calibration procedures partly uses information from the first set of calibration areas, wherein the further set of power calibration procedures is obtained using a subset of the first set of calibration areas.

2. The method as claimed in claim 1, wherein the first set of calibration areas comprises at least:
an area for optimum power calibration;
an area for a tilt and focus offset calibration; and
an area for a forward sense calibration.

3. The method as claimed in claim 2, wherein the subset of the first set of calibration areas comprises at least one of:
the area for the tilt and focus offset calibration; and
the area for the forward sense calibration.

4. The method as claimed in claim 1, wherein performing the first set of power calibration procedures on the optical record carrier at the first recording speed comprises:
performing an initial optimum power control procedure and finding an initial optimum power value;
performing a tilt and focus offset calibration using the found initial optimum power value and finding a tilt offset value and a focus offset value;
performing a final optimum power calibration using the found tilt offset value, the found focus offset value and finding a final optimum power value; and
performing a forward sense calibration using the found final optimum power value, the found tilt offset value and the found focus offset value.

5. A method comprising:
performing a first set of power calibration procedures on an optical record carrier at a first recording speed in a first set of calibration areas; and
performing a further set of power calibration procedures on the optical record carrier at a recording speed different from the first recording speed, wherein the further set of power calibration procedures partly uses information from the first set of calibration areas;
wherein the first set of calibration areas comprises at least an area for optimum power calibration, an area for a tilt and focus offset calibration, and an area for a forward sense calibration;
wherein a subset of the first set of calibration areas comprises at least one of the, area for the tilt and focus offset calibration, and the area for the forward sense calibration, and
wherein the further set of power calibration procedures comprises using an earlier recorded area for forward sense calibration and performing a further optimum power calibration and a further forward sense calibration.

6. The method as claimed in claim 5, wherein performing the further set of power calibration procedures on the optical record carrier at the recording speed different from the first recording speed comprises:
performing the further optimum power calibration using the subset of the first set of power calibration areas associated with the first set of power calibration procedures and finding the optimum power value, the tilt offset value and the focus offset value; and
performing the forward sense calibration using the found optimum power value.

7. The method as claimed in claim 6, wherein, in performing the further optimum power calibration, a recorded area which is already present on the optical record carrier is re-used, wherein the recorded area is one of an initial focus offset calibration area, an initial tilt offset calibration area and a forward sense calibration area.

8. An optical drive comprising:
means arranged to perform a first set of power calibration procedures on an optical record carrier at a first recording speed in a first set of calibration areas; and
means arranged to perform a further set of power calibration procedures on the optical record carrier at a recording speed different from the first recording speed, wherein the further set of power calibration procedures partly uses information from the first set of calibration areas, wherein the further set of power calibration procedures is obtained using a subset of the first set of calibration areas.

9. A recorder comprising the optical drive as claimed in claim 8.

10. A non-transitory computer readable medium embodying computer instructions operative to cause a processor to perform the act of:
performing a first set of power calibration procedures on an optical record carrier at a first recording speed in a first set of calibration areas; and
performing a further set of power calibration procedures on the optical record carrier at a recording speed different from the first recording speed, wherein the further set of power calibration procedures partly uses information from the first set of calibration areas, wherein the further set of power calibration procedures is obtained using a subset of the first set of calibration areas.

* * * * *